Sept. 6, 1949.    A. HEURTIER    2,481,115
INTERMITTENT CLAW TYPE FILM DRIVING DEVICE
Filed June 5, 1947    2 Sheets-Sheet 1

INVENTOR.
Antoine Heurtier
BY
ATTORNEYS

Sept. 6, 1949.  A. HEURTIER  2,481,115
INTERMITTENT CLAW TYPE FILM DRIVING DEVICE
Filed June 5, 1947  2 Sheets-Sheet 2

INVENTOR.

Patented Sept. 6, 1949

2,481,115

UNITED STATES PATENT OFFICE 2,481,115

INTERMITTENT CLAW TYPE FILM DRIVING DEVICE

Antoine Heurtier, Saint-Etienne, France

Application June 5, 1947, Serial No. 752,767
In France July 18, 1944

Section 1, Public Law 690, August 8, 1946
Patent expires July 18, 1964

7 Claims. (Cl. 88—18.4)

My invention relates to devices for feeding the films in cinematographic apparatus and has for its object an improved construction of such devices.

In accordance with my invention the improved feeding device comprises a claw-shaped member adapted to engage the film perforations and to drive the same, said claw member being provided with an opening in which there is disposed a rotating cam acting on two sides of the opening to oscillate the said claw member in a parallel and in a perpendicular direction with respect to the film, the said member being kept in engagement with the cam by a spring-loaded brush carried by the member and acting on the periphery of a disc rigid with the cam, and the said member being slidably engaged with a finger forming a fixed oscillation centre.

The invention is illustrated in the accompanying drawings in which.

Figure 1:
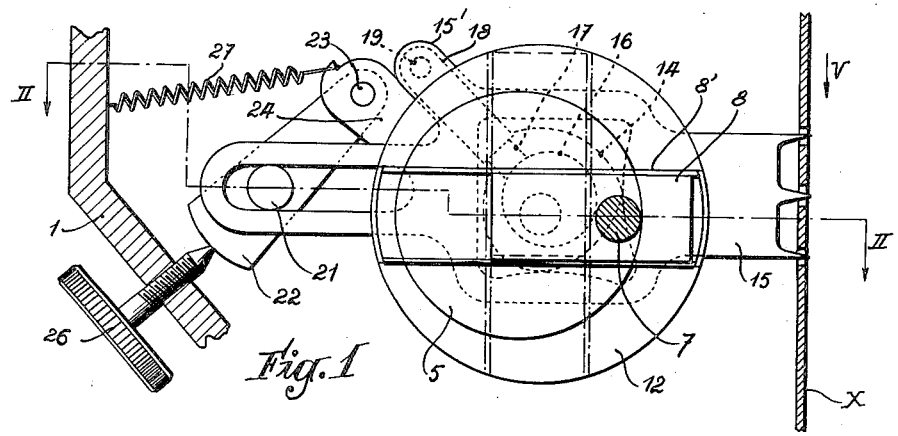
Fig. 1 is a front view of the unit.
Figure 2:
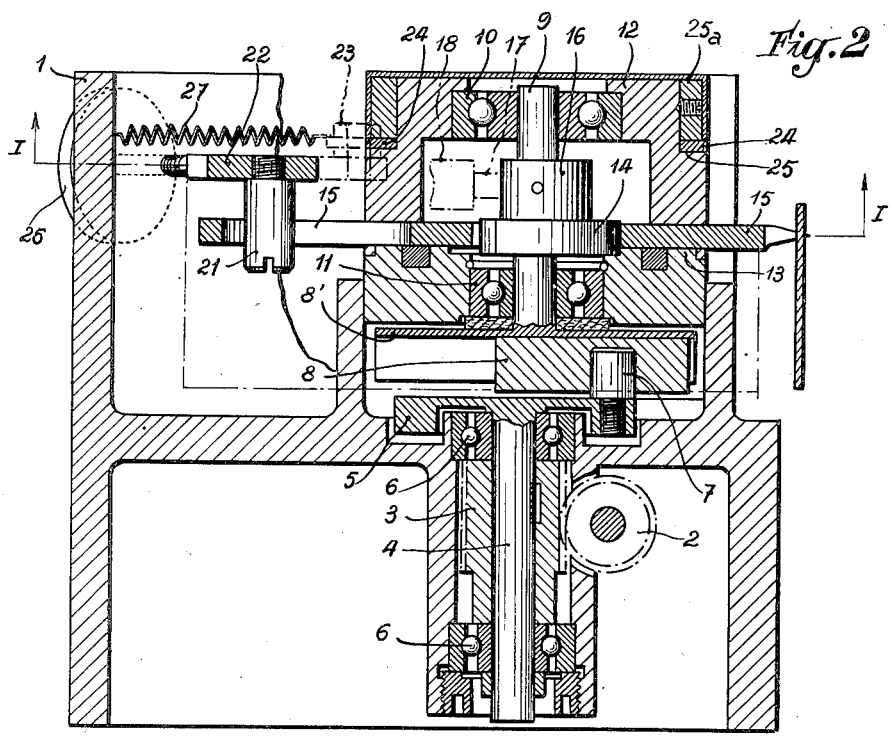
Fig. 2 is a longitudinal sectional view of the unit on the line 2—2 of Fig. 1.
Figure 3:
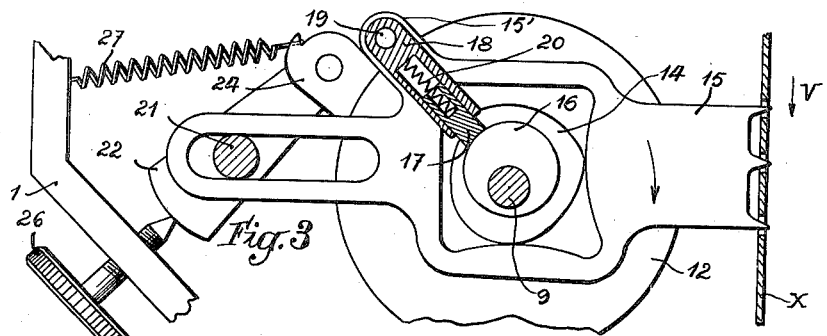
Figs. 3, 4 and 5 show three successive and different positions occupied by the claw-shaped member in driving the film.
Figure 4:
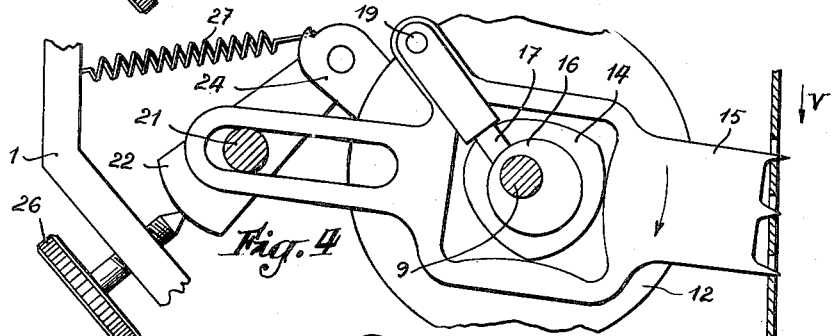
Figure 5:
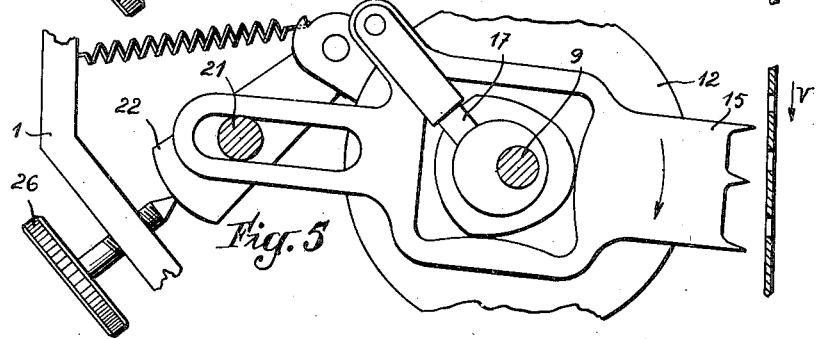

As shown, my novel feeding device having variable and regulatable movement comprises essentially a casing 1 of the cinematographic apparatus in which is journaled a drive shaft carrying a worm 2 which drives a toothed wheel 3 integral with a shaft 4 having at its upper end a plate 5. Shaft 4 is supported at its two ends in ball bearings 6 located in a boss in the casing 1.

Plate 5 has a driving pin 7 which engages in a hole in a shoe 8 sliding in a guide 8' which is integral with a shaft 9 supported by ball bearings 10 and 11 in the members 12 and 13 supported by the casing 1. At its central portion shaft 9 carries a heart-shaped cam 14 the periphery of which bears against the inner specially shaped cage of the claw-shaped member 15.

This heart-shaped cam 14 is integral with an eccentric disc 16 for the purpose of reducing the travel of a push rod 17 which bears on this eccentric disc 16 and is movable in a guide 18 clamped at 19 at the end of an arm 15' of the claw-shaped member 15. The guide 18 passes through an opening provided therefor in the wall of housing 12. A coil spring 20 ensures a permanent pressure of the push rod 17 against the eccentric disc 16 and consequently always maintains contact of the inner cage of the claw-shaped member 15 against the heart-shaped cam 14. The claw-shaped member 15 is displaced in accordance with the shape of the heart-shaped cam 14 and member 15 bearing simply or sliding on the adjustable abutment 21 which is located at the rounded end of a lever 22 secured by the bolt 23 to an arm of a disc 24 pivotally retained between the shoulder 25 of the member 12 and a detachable ring 25a secured on member 12, a spring 27 connecting the arm of the fixed disc 24 to the casing 1.

It will be understood that by changing the position of this adjustable abutment 21 there is obtained a different angular travel of the claw-shaped member 15, and consequently a different feeding action of the film $x$.

Figure 6:
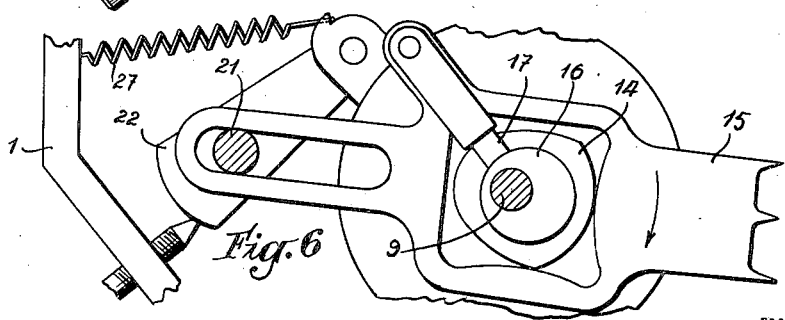
Fig. 6 is a diagrammatic view showing the claw-shaped member after the displacement of the adjustable abutment.

This difference in travel is in fact obtained by moving the adjustable abutment nearer to or further from the shaft 9 of the cam (as illustrated in Fig. 6).

A milled adjusting screw 26 carried by the casing 1 serves as an abutment for regulating the lever 22, thus permitting the placing of the film in the projection frame.

The above arrangement, as indicated, produces different actions:

1. Driving of the claw-shaped member 15 by an independent plate 5 which is eccentric in relation to the shaft 9 which latter carries the cam 14 operating the claw-shaped member 15; a speed of rotation is then transmitted which will be variable, according to the reciprocal eccentricity of shafts 4 and 9 which produces a special feed of the film.

2. The shaft 9 which carries the cam 14 rotates in variable time being followed by the claw-shaped member 15 which according to the shape of the cam 14 will then occupy successive positions which will permit of displacing it, feeding the film $x$ more rapidly during the passage from one image to the other which affords the possibility:

(a) Of engaging in the perforations of the film and of displacing it in the direction of the arrow $v$.

(b) Of releasing it rapidly without damaging the film.

(c) Of effecting precise adjustment of the travel of the claw-shaped member 15 by regulation of the abutment 21 of the claw-shaped member.

The guide for the film $x$ and the other parts not described take the usual form.

I claim:

1. A film feeding device for cinematographic apparatus and the like, comprising an oscillatable member having claws to engage successive film perforations and said member being formed with a first opening having two sides at an angle to each other and with a second opening disposed at the end opposite from said claws with respect to said first opening, said second opening being of elongated form with its longitudinal axis substantially directed towards said claws; a cam adapted for rotation in said first opening; a rotatable shaft to carry said cam; means to rotate said shaft; a circular disc eccentrically carried by said shaft adjacent the cam; means elastically carried by said member and adapted to press on said disc to maintain said cam in permanent contact with the said sides of said first opening to substantially oscillate said member in succession in a direction parallel to the portion of film engaged by said claws and in a direction perpendicular to said portion; and a fixed finger slidably engaged in said second opening to form a guide for said member.

2. In a feeding device as claimed in claim 1, said fixed finger being adjustable in a direction substantially parallel to the portion of film engaged by said claws.

3. In a feeding device as claimed in claim 1 said disc being in eccentric relation to said shaft with the eccentricity substantially disposed in registration with the eccentricity of said cam.

4. In a feeding device as claimed in claim 1, said first opening being of substantially square shape with one side substantially parallel to the portion of the film engaged by said claws, and said cam being in permanent contact only with the side of said first opening nearest to said claws and with one of the sides adjacent thereto.

5. A film feeding device for cinematographic apparatus and the like, comprising an oscillatable member having claws to engage successive film perforations and said member being formed with a first opening having two sides at an angle to each other and with a second opening disposed opposite said claws with respect to said first opening, said second opening being of elongated form with its longitudinal axis substantially directed towards said claws; a cam adapted for rotation in said first opening; a rotatable shaft to carry said cam; means to rotate said shaft; a disc carried by said shaft; means elastically carried by said member and adapted to press on said disc to maintain said cam in permanent contact with the said sides of said first opening to substantially oscillate said member in succession in a direction parallel to the portion of film engaged by said claws and in a direction perpendicular to said portion; a finger slidably engaged in said second opening to form a guide for said member; an arm pivoted co-axially to said shaft; a second arm secured at the free end of said first arm, said second arm carrying said finger; an abutment for said second arm; and spring means to press said second arm against said abutment.

6. In a feeding device as claimed in claim 5, said abutment being in the form of an adjustable screw.

7. A film feeding device for cinematographic apparatus comprising an oscillatable member having claws to engage successive film perforations, and said member being formed with a first opening having two sides at an angle to each other and with a second opening disposed opposite said claws with respect to said first opening, said second opening being of elongated form with its longitudinal axis substantially directed towards said claws; a cam adapted for rotation in said first opening; a rotatable shaft to carry said cam; means to rotate said shaft; a disc eccentrically carried by said shaft; a tubular guide carried by said oscillatable member in substantially radial relation to said shaft and substantially in the mean transverse plane of said disc; a brush slidable in said guide and adapted to bear on the periphery of said disc; spring means to urge said brush against said disc to maintain said cam in permanent contact with the said sides of said first opening to substantially oscillate said member in succession in a direction parallel to the portion of film engaged by said claws and in a direction perpendicular to said portion; and a fixed finger slidably engaged in said second opening to form a guide for said member.

ANTOINE HEURTIER.

REFERENCES CITED

The following references are of record in the file of this patent:

UNITED STATES PATENTS

| Number | Name | Date |
| --- | --- | --- |
| 2,046,572 | Merta | July 7, 1936 |

FOREIGN PATENTS

| Number | Country | Date |
| --- | --- | --- |
| 501,188 | Great Britain | Feb. 22, 1939 |